US011582393B1

(12) United States Patent
Zenero et al.

(10) Patent No.: US 11,582,393 B1
(45) Date of Patent: Feb. 14, 2023

(54) INDUSTRIAL TOOL IMAGING

(71) Applicant: Teradata US, Inc., San Diego, CA (US)

(72) Inventors: Nathan Zenero, Cypress, TX (US); Eric van Oort, Austin, TX (US); Ysabel Witt-Doerring, Potts Point (AU); Jacob Lubecki, Austin, TX (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 16/910,041

(22) Filed: Jun. 23, 2020

(51) Int. Cl.
*H04N 7/18* (2006.01)
*H04N 5/232* (2006.01)
*H04N 5/225* (2006.01)
*H04N 13/204* (2018.01)
*H04N 5/247* (2006.01)

(52) U.S. Cl.
CPC ....... *H04N 5/23299* (2018.08); *H04N 5/2252* (2013.01); *H04N 5/2253* (2013.01); *H04N 5/2256* (2013.01); *H04N 5/247* (2013.01); *H04N 7/18* (2013.01); *H04N 13/204* (2018.05)

(58) Field of Classification Search
CPC ....... B29C 64/386; B29C 67/00; B33Y 50/00; B33Y 80/00; B33Y 10/00; B33Y 50/02; G01B 11/2513
USPC .......................................................... 348/48
See application file for complete search history.

(56) References Cited

U.S. PATENT DOCUMENTS

2013/0278725 A1* 10/2013 Mannan .................. G06F 30/17
348/46
2020/0160497 A1* 5/2020 Shah ..................... B29C 64/386

OTHER PUBLICATIONS

Lubecki, et al., "Bit Damage Image Capture and Analysis", Apr. 3, 2019, 23 pgs., Austin, TX.
Rassenfoss, "There's More to Dull Drill Bits Than Meets the Eye", Apr. 2, 2020, Journal of Petroleum Technology, 7 pgs.

* cited by examiner

*Primary Examiner* — Masum Billah
(74) *Attorney, Agent, or Firm* — Randy L. Campbell, Jr.

(57) ABSTRACT

An imaging system may include a housing having shape and size sufficient to receive an industrial tool inserted into the housing. The imaging system may further include a plurality of cameras and a plurality of light sources positioned within the housing in a manner to surround the industrial tool upon insertion of the industrial tool into the housing. The imaging system may include a processing unit to control operation of the cameras and light sources and adjust relative positions of the cameras and light sources in relation to the industrial tool to capture a plurality of images of relevant portions of the industrial tool. The plurality of images collectively reveals substantially all of the relevant portions of the industrial tool. A method and computer-readable medium are also disclosed.

20 Claims, 13 Drawing Sheets

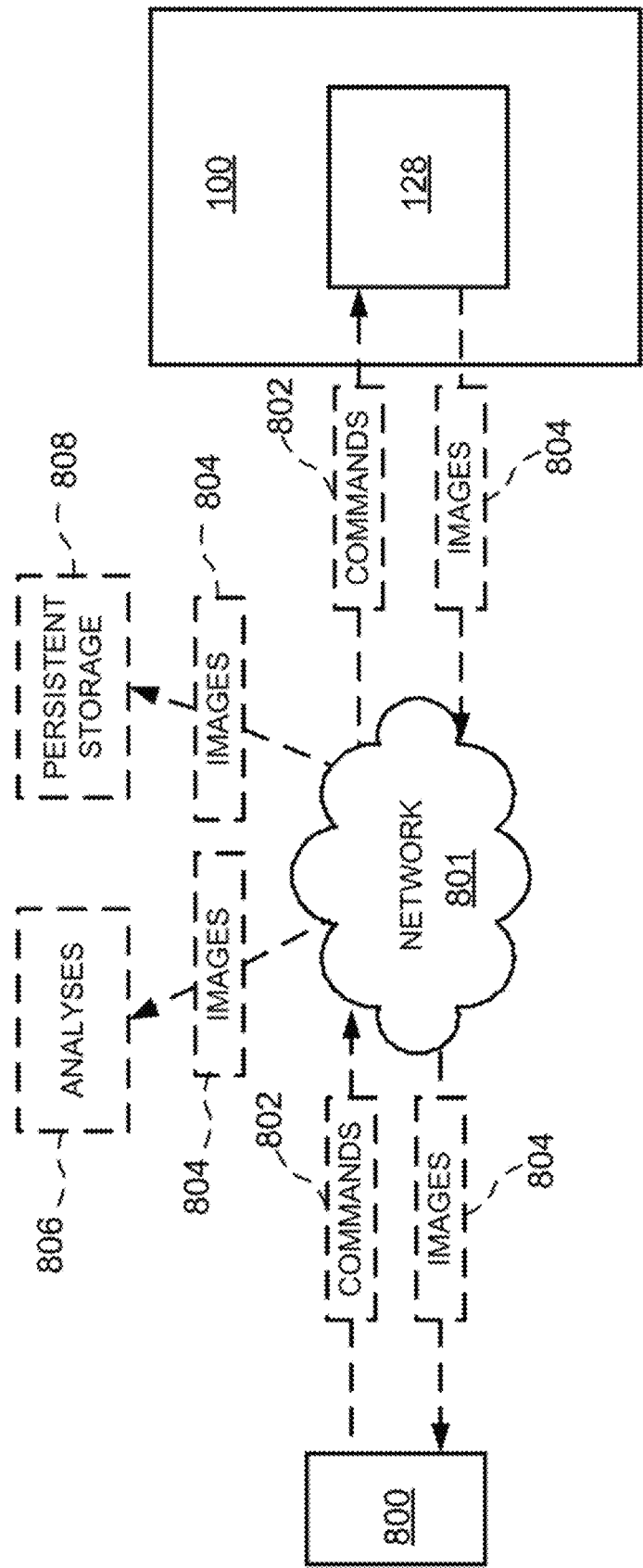

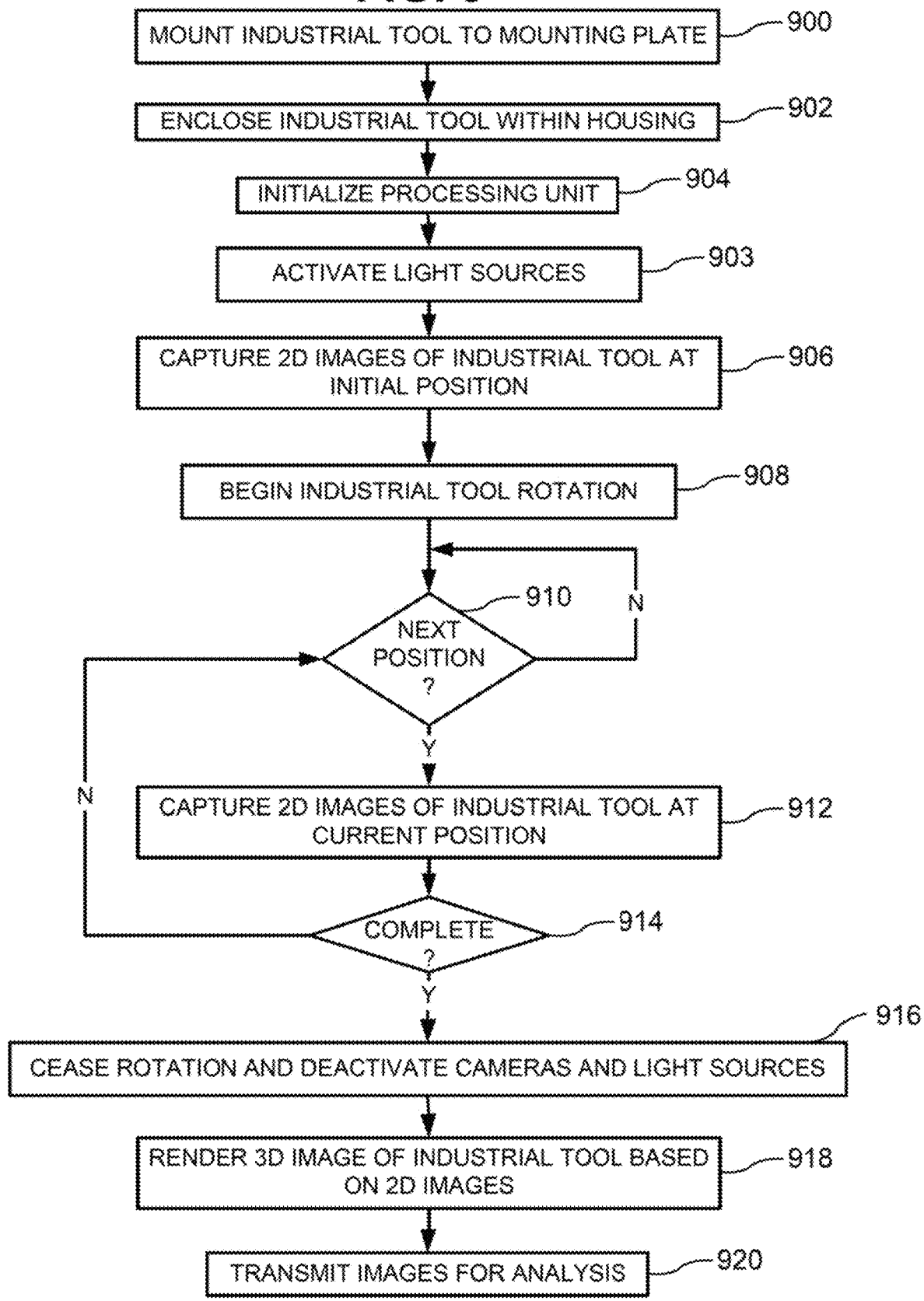

INDUSTRIAL TOOL IMAGING

BACKGROUND

Real-time inspection of field-based industrial tools is critical in preventing future failures. For example, drilling wellbores require the use of expensive heavy-duty drill bits. As the drill bits are used, they wear and sometimes fail due to various causes. Forensic analysis and/or fault analysis may be conducted by onsite personnel; however, this can be a daunting task requiring one or more individuals to visually inspect a drill bit for causes of wear and/or failure in order to prevent replacement drill bits from suffering a similar fate. Often times, visual inspections by an individual may be hindered by various obstacles, such as the time of day or shape of the drill bit. For example, if an oil-well drill bit fails on an oil rig at night, visual inspection may be difficult due to lack of adequate light. Also, fault detection via visual inspection requires an individual with knowledge of failure causes who may not be available in all situations.

Thus, it would be desirable to implement an imaging system to capture images of various industrial tools capable of being used for real-time inspection and analysis.

SUMMARY

According to one aspect of the disclosure, an imaging system may include a housing having shape and size sufficient to receive an industrial tool inserted into the housing. The imaging system may further include a plurality of cameras and a plurality of light sources positioned within the housing in a manner to surround the industrial tool upon insertion of the industrial tool into the housing. The imaging system may include a processing unit to control operation of the cameras and light sources and adjust relative positions of the cameras and light sources in relation to the industrial tool to capture a plurality of images of relevant portions of the industrial tool. The plurality of images collectively reveals substantially all of the relevant portions of the industrial tool.

According to another aspect of the disclosure, A method may include controlling, with a processing unit, operation of a plurality of cameras and a plurality of light sources positioned in a housing in a manner to surround an industrial tool. The housing may be of a shape and size sufficient to receive the industrial tool. The method may further include adjusting, with the processing unit, relative positions of the cameras and light sources in relation to the industrial tool to capture a plurality of images of relevant portions of the industrial tool. The plurality of images collectively reveals substantially all of the relevant portions of the industrial tool.

According to another aspect of the disclosure, a computer-readable medium may be encoded with a plurality of instructions executable by a processor. The plurality of instructions may include instructions to control operation of a plurality of cameras and a plurality of light sources positioned in a housing in a manner to surround an industrial tool. The housing may be of a shape and size sufficient to receive the industrial tool. The plurality of instructions may further include instructions to adjust relative positions of the cameras and light sources in relation to the industrial tool to capture a plurality of images of relevant portions of the industrial tool. The plurality of images collectively reveals substantially all of the relevant portions of the industrial tool.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 8 is a block diagram of an industrial tool imaging system in a communication environment.

FIG. 9 is an operational flow diagram of an industrial tool imaging system

DETAILED DESCRIPTION OF THE FIGURES

Figure 1:
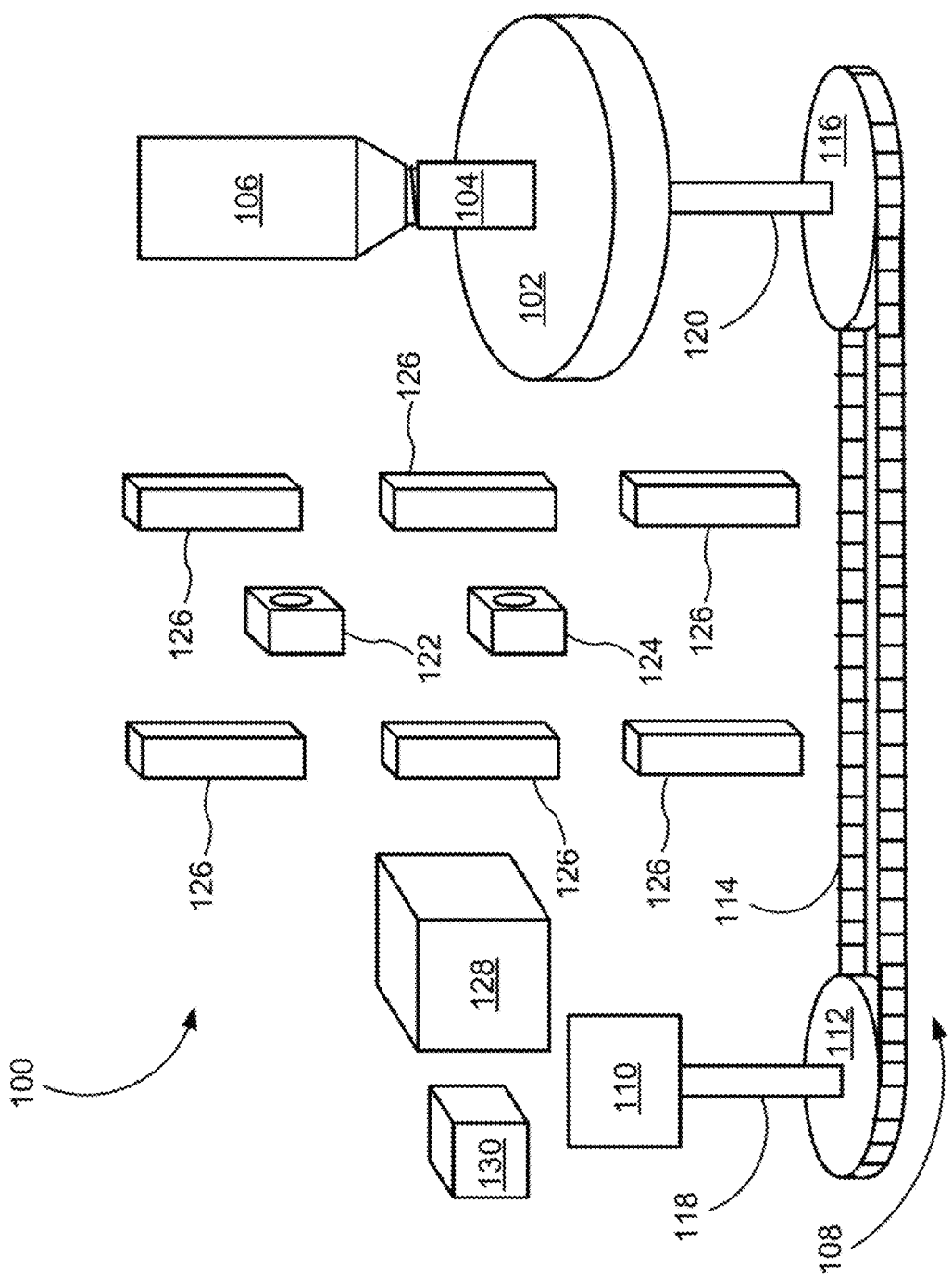
FIG. 1 is perspective view of internal components of an example industrial tool imaging system.

FIG. 1 is a diagrammatic perspective view of internal components of an industrial tool imaging (ITI) system 100. In one example, a mounting plate 102 may include a coupling device 104 on which an industrial tool 106 may be mounted. In one example, the coupling device 104 may include a threaded receiver correlated to the threads of the industrial tool 106, a detent device to allow alignment or prevent rotation of the industrial tool 106, a keyway to receive or align a key-shaft of the industrial tool 106, and/or a shaft or other cylindrical element that is slightly smaller than the inner diameter of a passageway in the industrial tool 106 such as the inner section of a tube.

A drive system 108 may be used to actuate the mounting plate 102, which in one example may be rotation of the mounting plate 102. The drive system 108 may include a motor 110, drive gear 112, chain 114, and mounting plate gear 116. In one example, the drive gear 112 may be coupled to a shaft 118 of the motor 110. A mounting plate shaft 120 may extend from the mounting plate 102 and coupled to the mounting plate gear 116. The chain 114 may couple the drive gear 112 to the mounting plate gear 116 causing the mounting plate 102 to rotate during operation of the motor 110.

The ITI system 100 may include cameras 122, 124 and light sources 126. The cameras 122, 124 may be positioned to capture images of the industrial tool 106 during rotation. The light sources 126 may be selected to emit one or more types of light spectra desired to illuminate areas of the industrial tool 106 to be captured by the cameras 122, 124, such as visible light, ultra-violet (UV) light, and infrared light, for example. Each light source 126 may emit a single type of light or may emit different types. The cameras 122, 124 and light sources 126 may be positioned with respect to the industrial tool 106 in order to optimize lighting, reduce shadows on the industrial tool, and capture as much surface as possible on the industrial tool 106. The cameras 122, 124 and light sources 126 may be positioned with respect to the industrial tool 106 in order to induce oblique lighting or to use shadows or reflections to more readily identity certain features or aspects of the industrial tool.

The ITI system 100 may include a processing unit 128 and a power supply 130. The processing unit 128 may control the motor 110, cameras 122, 124, and light sources 126. The power supply 130 may provide power to each electrical device included in the ITI system 100, such as the motor 110, cameras 122, 124, and light sources 126. The power supply 130 may include batteries, as well as allow the ITI system 100 to be electrically supplied via an electrical outlet through a power cord (not shown). In some examples, batteries used by the power supply 130 may be rechargeable via an electrical outlet. Both the processing unit 128 and power supply 130 may be connected to the motor 110, cameras 122, 124, and light sources 126.

Figure 2:
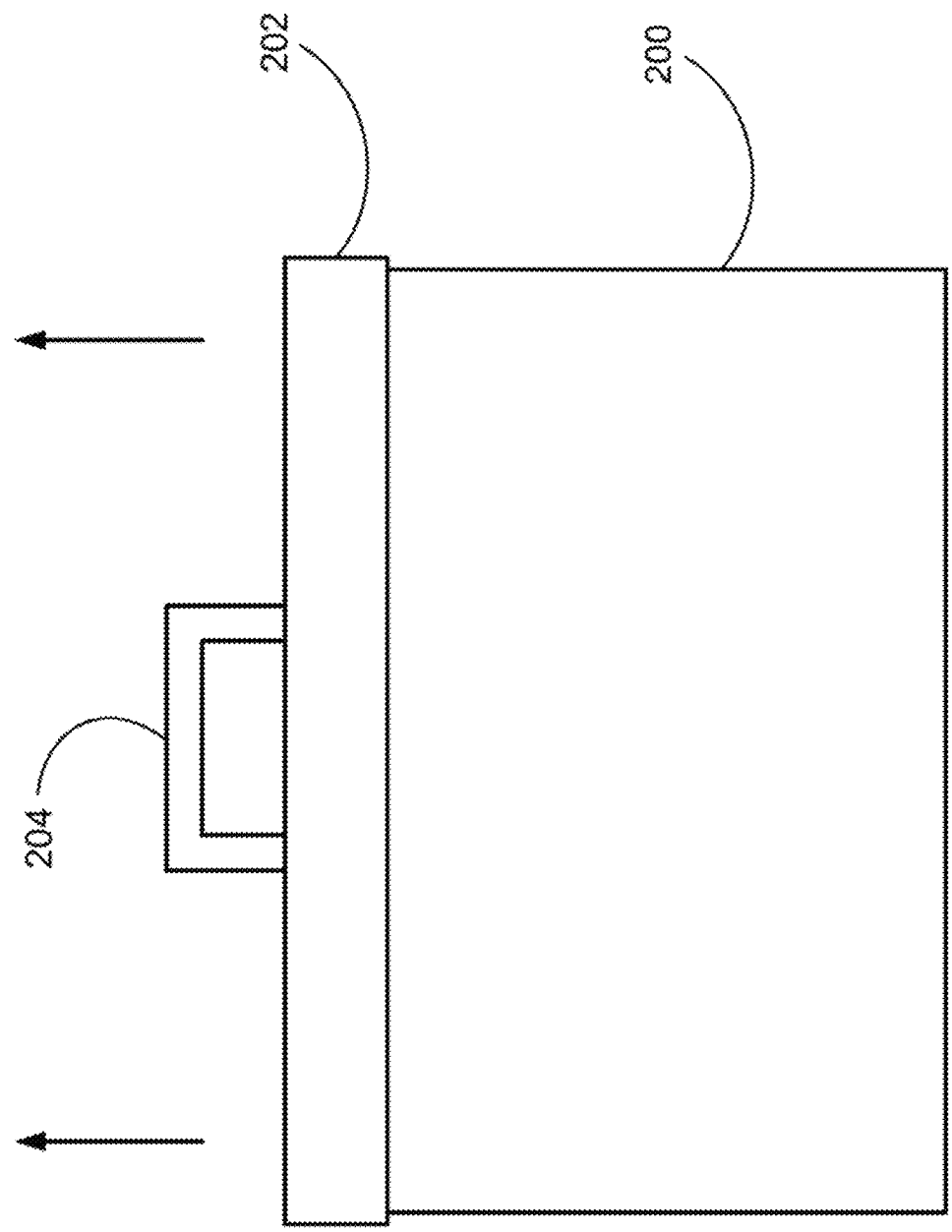
FIG. 2 is a plan view of an industrial tool imaging system.

FIG. 2 plan view of the M system 100. The ITI system 100 may include a housing 200, and removable lid 202 that may be made one or more types of materials including plastic, metal, composites, or any suitable material. In some examples, the lid 202 may include a top-mounted handle 204 and/or side-contoured grips (not shown) allowing the lid 202 to be manually lifted off. Other suitable manners of assisting in removal of the lid 202 may be implemented in other examples. In yet other examples, the lid 202 may be selectively fixed to the housing 200 allowing both the housing 200 and lid 202 to be transported together.

Figure 3:
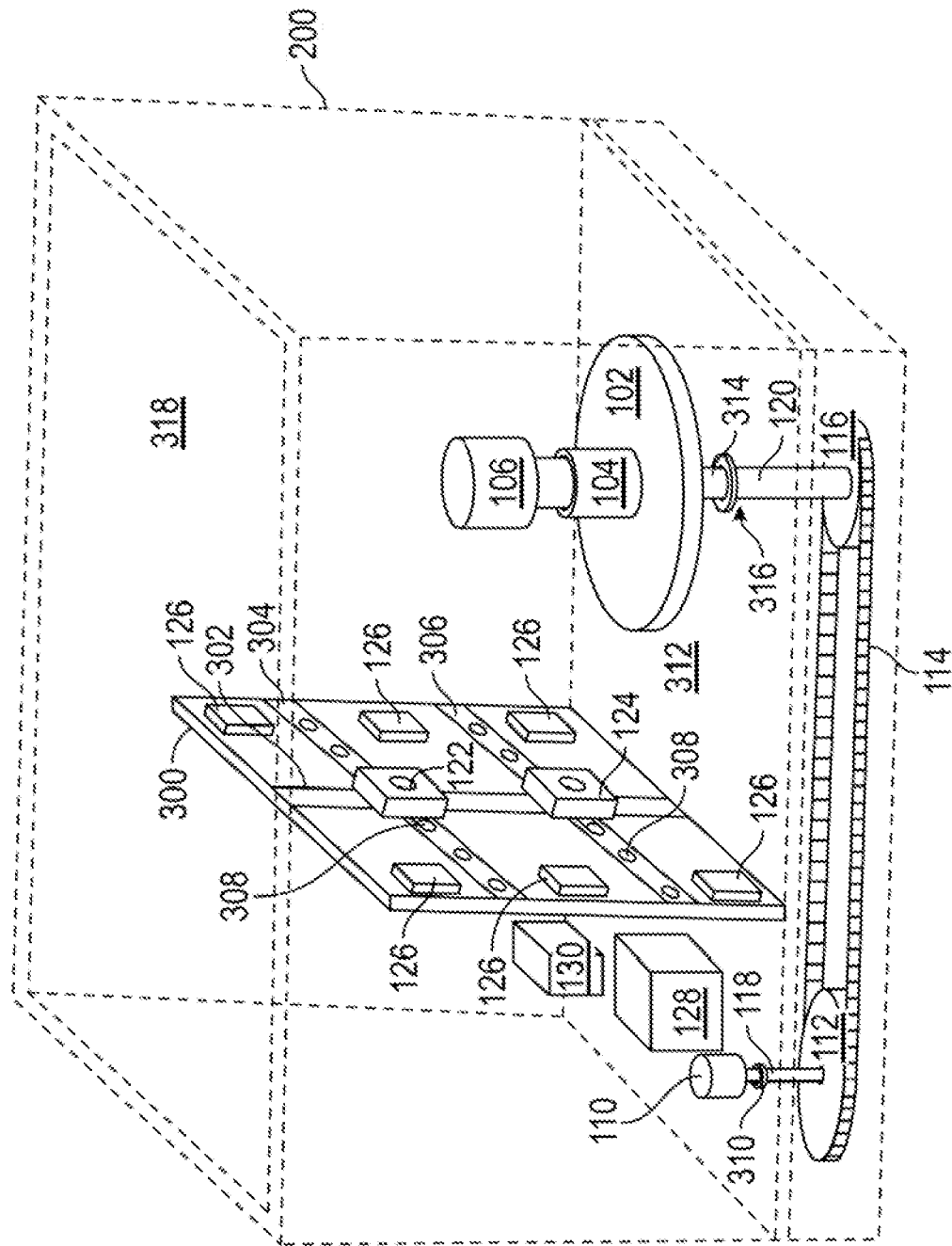
FIG. 3 is an internal perspective view of an example industrial tool imaging system.

FIG. 3 is a perspective internal view of the housing 200 (shown in dashed lines) with lid 202 removed. In one example, the housing 202 may include an interior wall 300. Bracket 302 may be fastened to the interior wall 300 through various types of suitable fasteners (not shown) and cross brackets 304, 306 may be attached to the bracket 302. The cross brackets 304, 306 may be selectively movable vertically along the bracket 302. The cross brackets 304, 306 may be used to mount cameras 122, 124, respectively. The cameras 122, 124 may be moved to different positions along the respective cross bracket 122, 124, with each camera 122, 124 being mounted the respective cross bracket 304, 306 with a ball mount 308. The ball mount 308 allows the camera to be rotationally moved allowing positioning of the cameras 122, 124 to capture desired images of the industrial tool 106.

The drive shaft 118 of the motor 110 may extend through an opening 310 an interior floor 312. The mounting plate drive shaft 120 may be supported by a bearing assembly 314 attached to opening 316 in the interior floor 312. The processing unit 128 and power supply 130 may be mounted to the interior floor 312 through brackets and/or fasteners (not shown) suitable for securing the processing unit 128 and the power supply 130 within the housing 200. While the connections are not shown in FIG. 3, it should be recognized that any power connection from the power supply 130 and control connections from the processing unit 128 may be sized appropriately to the target component. The power supply 130 may provide power to the processing unit 128 as well.

The light sources 126 may be mounted to the interior wall 300 or other interior surfaces of the housing 200 allowing the light sources 126 to direct light to eliminate any shadowing on the industrial tool 106. The light sources 126 may be mounted using one or more various fasteners, such as adhesives, screws, or other suitable fasteners (not shown). Various spectra may be implemented using the light sources 126, such as visible, infra-red, and ultraviolet, for example. The number of light sources 126 may be selectively chosen based on the type of industrial tool 106 under analysis. In other examples, each individual light source 126 may emit a respective type of light spectra, which may be the same or different type as other light sources 126.

During operation, the lid 202 may be placed on the housing 200 once the industrial tool 106 is properly secured to the mounting plate 102 via the coupling device 104 in order to completely or substantially darken the space 318 within the housing 102 where the industrial tool 106 is analyzed. The cameras 122, 124 may capture two-dimensional (2D) images, via still shot or video, of the industrial tool 106 at different radial positions with the motor 110 rotating the mounting plate 102 at a specific rate to capture a desired number of images and/or videos at specific radial positions. For example, the industrial tool 106 may be an oil-well drill bit, such as those used for oil-well drilling. In one example, the gear wheels 112, 116 may include a 12:5 transmission ratio with the motor 110 rotating at 0.5 RPM for an oil well drilling bit.

Figure 4:
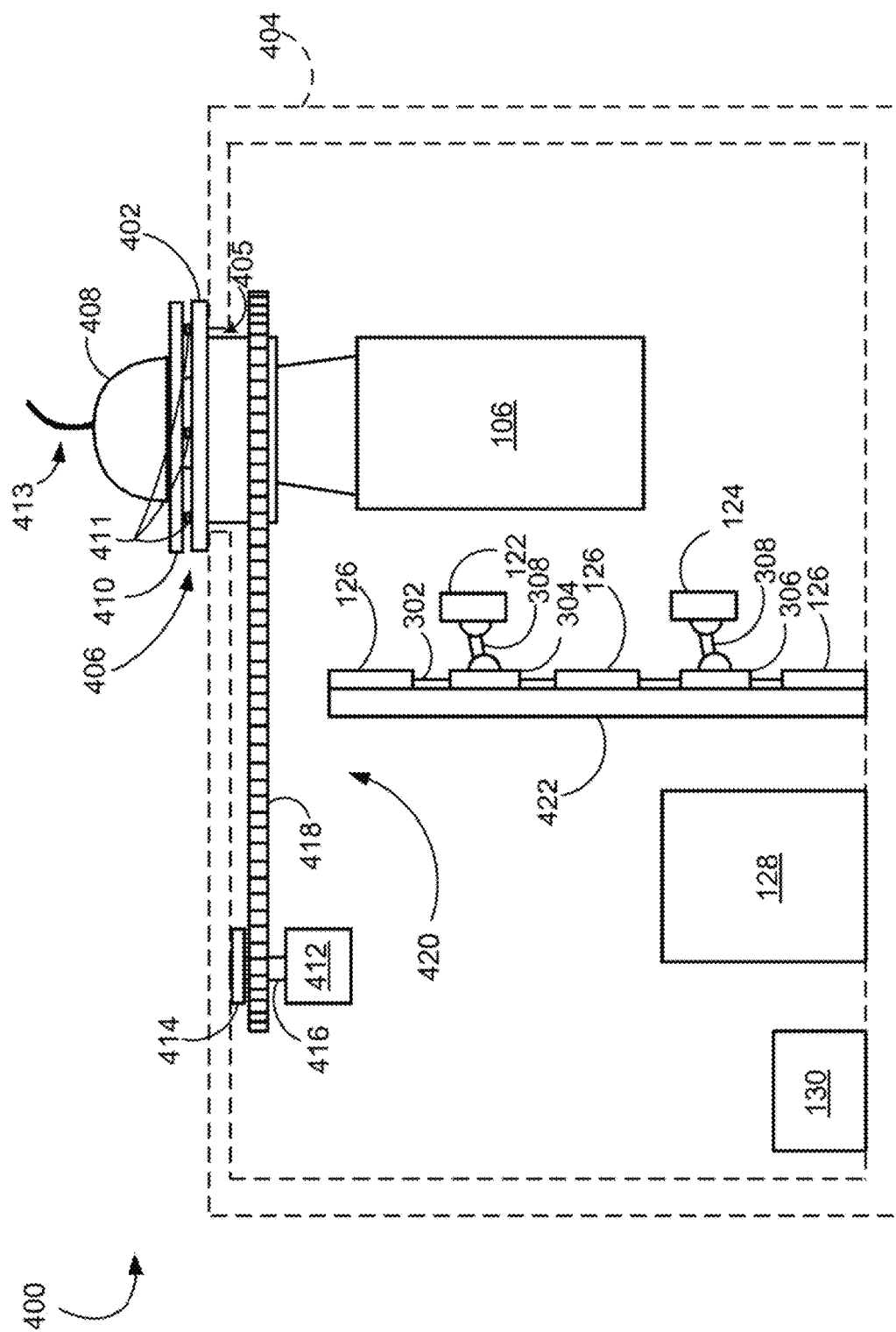
FIG. 4 is an internal plan view of an example industrial tool imaging system.

FIG. 4 is an interior diagram of another example of an ITI system 400. The ITI system 400 may include a bearing brace 402. The bearing brace 402 may be cylindrical in shape having fixed outer ring and an inner ring (not shown) rotatable with respect to the outer ring. The outer ring of the bearing brace 402 may be fastened to a housing 404 (shown in dashed lines) using suitable manners of fasteners (not shown). The outer diameter of the bearing brace 402 may be wider than an opening 405 in the housing 404, which may be circular in shape in one example.

A drive tube 406 may be secured to the inner ring of the bearing brace 402 allowing the drive tube 406 to rotate with the inner ring of the bearing brace 402. A threaded shaft (not shown) of the industrial tool 106 may be screwed into an end cap 408, which may have a threaded interior cavity to match the threads of the threaded shaft. The end cap 408 may be integrally formed with a bearing plate 410, which may engage the bearing brace 402 when the industrial tool is 106 is placed within the housing 404.

The bearing brace 402 and drive tube 406 may each have an opening (not shown) wide enough to allow the industrial tool 106 to pass through, but each having a size narrower than the outer edge of the support plate 410 allowing the industrial tool 106 to be suspended from the end cap 408 and support plate 410 A grip line 413, which may be a cable, chain, or other suitable tether, may be connected the end cap 408 allowing the end cap 408, support plate 410, and industrial tool 106 to be lifted and placed on the housing 404. The bearing brace 402 and housing 404 may support the weight of the end cap 408, bearing plate 410, and the industrial tool 106 allowing the industrial tool 106 to be properly positioned within the housing 404 for imaging. Support posts 411 may provide a slight separation between the inner ring of the bearing brace 402 and support plate 410 to eliminate contact with the fixed outer ring of the bearing brace 402 allowing the bearing plate 410 to rotate with the inner ring of the bearing brace 402.

A motor 412 may be mounted to a bearing assembly 414. The bearing assembly 414 may be secured to the housing 404 using one or more various types of suitable fasteners (not shown) and having rotational components with respect to the housing 404. The motor 412 may be fixed (not shown) with respect to the housing 404 and may be coupled to a drive shaft 416 having a gear wheel (not shown) coupled to it or integrated with it. The bearing assembly 414 may also be coupled to or integrated with a gear wheel (not shown). A chain 418 may couple the gear wheels allowing the motor 412 to rotate the drive tube 406, which also rotates the bearing brace 402 allowing the industrial tool 106 to be rotated for imaging. The motor 412, bearing brace 402, bearing plate 410, bearing assembly 414, chain 418, and gear wheels make up a drive system 420 which rotates the industrial tool 106.

The ITI system 400 may include cameras 122, 124 mounted on bracket 302 and cross brackets 304, 306 in a manner similar to that described regarding ITI system 100. Bracket 302 may be mounted to interior wall 422. Light sources 126 may also be mounted within the housing 402 in a manner similar to the mounting described regarding the ITI system 100. In some examples, the weight of the industrial tool 106, support plate 411, and end cap 410 may be such that there is no slippage between the bearing brace 402 and the support plate 410 during rotation. Moreover, the dimensions of the support plate 411 and bearing plate 402 may block substantially all ambient light into the housing 404 allowing optimization of the imaging with cameras 122, 124 and light sources 126.

Processing unit 128 may control the motor 412, cameras 122, 124, and light sources 126 to capture images of the industrial tool 106 at different radial positions. Similar to the ITI system 100, the gearing ratio of the gear wheels may be selected to rotate the industrial tool 106 at specific radial rate amount based on the speed of the motor 412. The power supply 130 may power the processing unit 128, motor 416, cameras 122, 124, and light sources 126 in a manner similar to that described with regard to ITI system 100.

Figure 5:
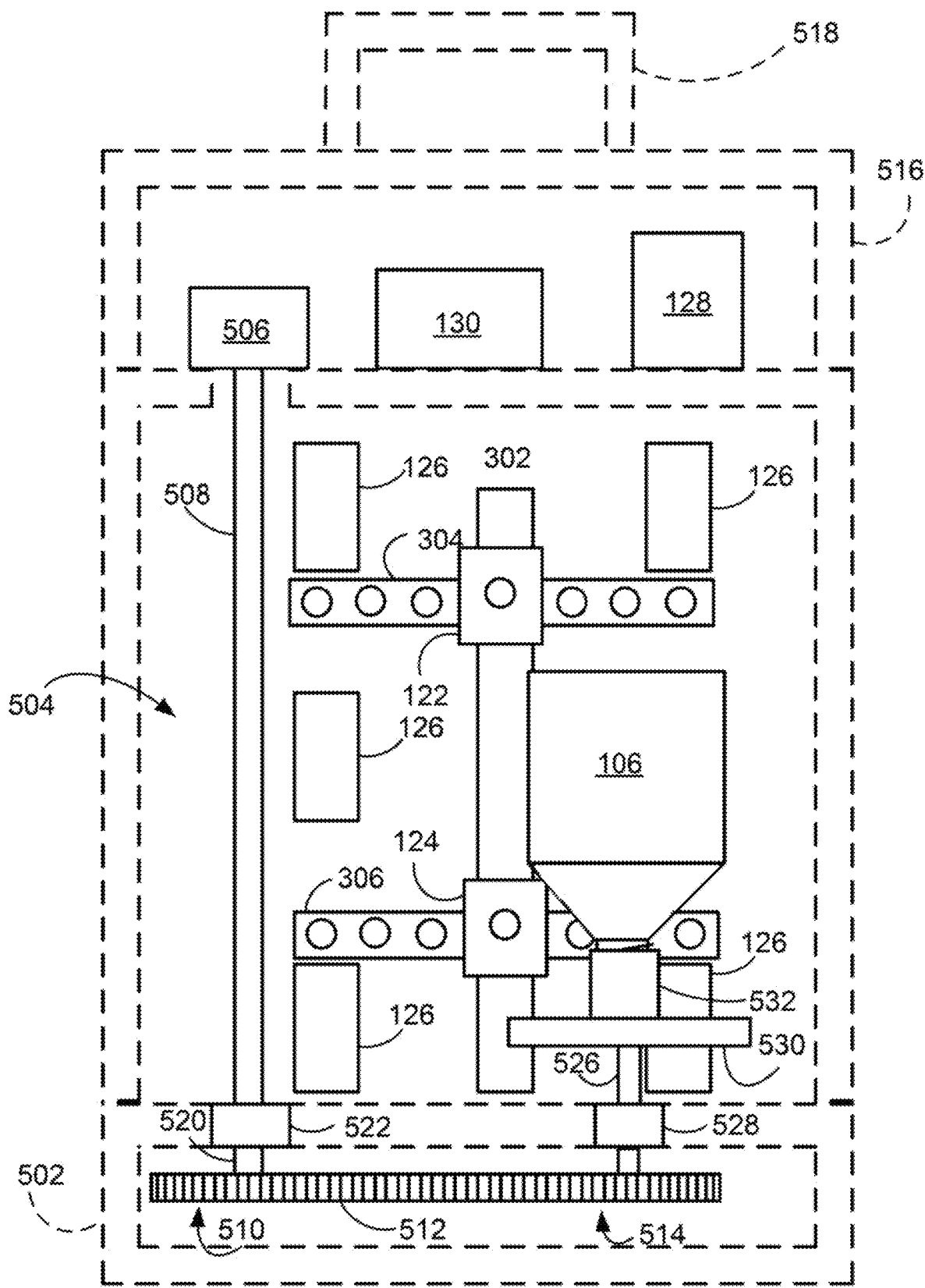
FIG. 5 is an internal plan view of an example industrial tool imaging system.

FIG. 5 is interior side view of another example of an ITI system 500 in a "cake box" configuration. In the configuration of ITI system 500 a base 502 (shown in dashed lines) and a drive system 504, which includes a motor 506, drive shaft 508, drive gear wheel 510, chain 512, and mounting plate gear wheel 514. The ITI system 500 may include a cover 516 having a handle 518 (both shown in dashed lines). The cover 516 may be placed downward onto the base 502 such that a primary drive shaft 508 coupled to the motor 506 engages a secondary drive shaft 520. In one example, the cover 516 may fit the base 502 in a particular manner allowing the drive shaft 508 to align with the secondary drive shaft 520. In some examples, the cover 516 may be selectively secured the base 502 allowing the entire ITI system 500 to be transported together.

The secondary drive shaft 520 may be mounted within the base 502 through a bearing assembly 522, which may also be engaged by the drive shaft 508, allowing the secondary drive shaft 520 to rotate when driven by the motor 506 via the drive shaft 508. The drive wheel gear 510 may be coupled to the secondary drive shaft 520 or may be integrated into the secondary drive shaft 520. The chain 512 may couple the drive gear wheel 510 to the mounting plate gear wheel 514. The mounting plate gear wheel 514 may be coupled to a mounting plate drive shaft 526, which may be mounted within the base 502 through a bearing assembly 528 allowing the mounting plate drive shaft 516 to rotate. A mounting plate 530 may be fastened to the mounting plate drive shaft 528 or may be integrally formed with it. The mounting plate 530 may include a coupling 532 allowing the industrial tool 106 to be coupled to the mounting plate 530.

Cameras 122, 124 may be mounted to cross brackets 304, 306, respectively. The cross brackets 304, 306 may be mounted to bracket 302, which may be fastened to the interior of the cover 516. While the shape of the base 502 and cover 516 is rectangular in FIG. 5, other shapes may be used, such as cylindrical, for example. Using a cylindrical shape would implement curved brackets to mount the cameras 122, 124.

The processing unit 128 and the power supply 130 may be positioned in the top of the cover 516 and mounted to an interior surface 534. The processing unit 128 may control the motor 506, cameras 122, 124, and light sources 126 to capture images of the industrial tool 106 at different radial positions. The cover 516 may be segmented to allow access to the processing unit 128, power supply 130, and the motor 506.

Similar to the ITI system 100, the gearing ratio of the drive gear wheel 510 and mounting plate gear wheel 514 may be selected to rotate the industrial tool 106 at specific radial rate based on the speed of the motor 506 controlled by the processing unit 128. The power supply 130 may power the processing unit 128, motor 506, cameras 122, 124, and the light sources 126.

Figure 6:
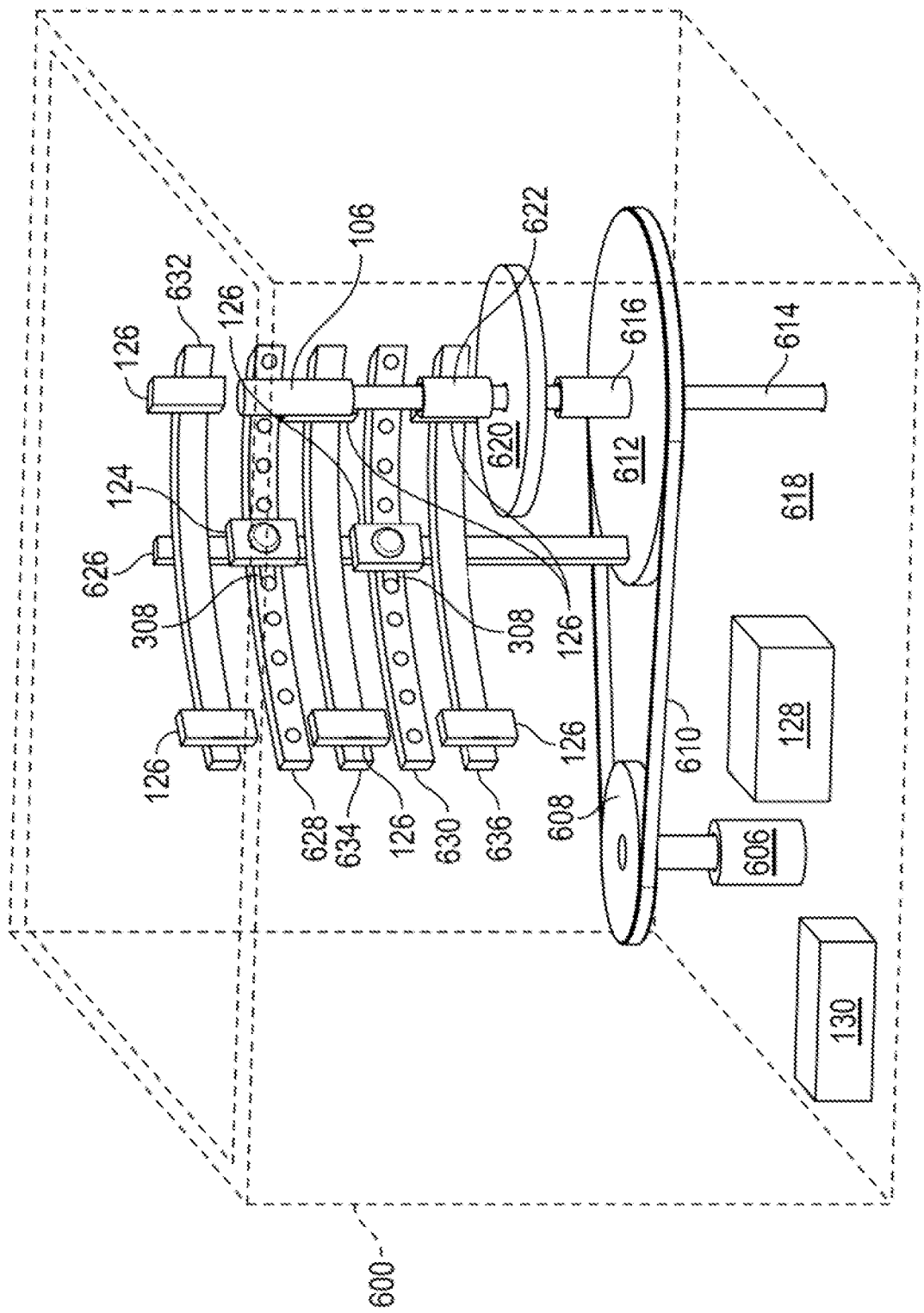
FIG. 6 is an internal perspective view of an example industrial tool imaging system.

FIG. 6 is an internal perspective view of another example of an ITI system 600. In one example, a housing 602 (shown in dashed lines) may be configured similar to housing 200 including lid 202 (not shown). A drive system 604 may include a motor 606, drive gear wheel 608, chain 610, and imaging drive wheel 612. The imaging drive wheel 612 may be coupled to a mounting shaft 614 via a bearing assembly 616 with the mounting shaft 614 secured to floor 618 of the housing 600.

A mounting plate 620 may be secured to the mounting shaft 614 via any suitable fastening manner or may be integrated into the mounting shaft 614. A coupling device 622 may be secured to the mounting plate 620 or integrated into it. The coupling device 622 may be similar to the coupling device 104 in ITI system 100.

In one example, the imaging drive wheel 612 may be connected to imaging frame 624. The imaging frame 624 may be coupled to the imaging drive wheel 612 via suitable fasteners or may be integrated to the imaging drive wheel 612. The imaging frame 624 may include a vertical bracket 626, which is secured to the imaging drive wheel 612. The cross bracket may support camera brackets 628, 630 and lighting brackets 632-636. The camera brackets 628, 630 and lighting brackets 632-636 may be selectively positionable along the vertical bracket 626. Each of the brackets may be 628-636 may be curved, but in other examples one or more may be straight. The cameras 122, 124 may be secured the respective camera brackets 628, 630 via the ball mount 308. The lighting brackets 632-636 may each support one or more light sources 126, which may be selectively positionable along each bracket 632-636 via fasteners (not shown).

The motor 606 may be mounted to the housing floor 618 along with processing unit 128 and power supply 130. During operation, the industrial tool 106 may be securing to the coupling device 622. The processing unit 128 may be mounted on the housing floor 618 and control the motor 606 to cause the imaging frame 624 to rotate around the industrial tool 106. The processing unit 128 may also control the cameras 122, 124 and light sources 126 to capture images (still-shot or video) of the industrial tool 106. The processing unit 128 may control the motor 606 to rotate the imaging frame 614 into one more predetermined radial positions with respect to the industrial tool 106 allowing specific images to be captured with the cameras 122, 124 with desired lighting from light sources 126. While not shown, cabling from both the processing unit 128 and the power supply 130 may be arranged in a way to allow a full rotation of the imaging frame 624 without hindering rotation of the imaging frame 624. In other examples, the imaging frame 624 may rotate 180 degrees before returning to a start position and rotating 180 degrees in the opposite direction to complete a full 360 path around the industrial tool 106.

In other examples of the ITI systems 100, 400, 500, and 600, additional cameras and light sources may be used with the industrial tool 106. In some of these examples, no motor is used and the cameras, light sources, and industrial tool 106 are in fixed positions allowing multiple 2D images to be captured at once to be rendered into a three-dimensional (3D) image. In yet other examples, an interior housing wall opposite the cameras 122, 124 in ITI systems 100, 400, 500 may be of a color that offers contrast to the color of a specific industrial tool 106. In the ITI system 600 all walls may be of a contrasting color with respect to the industrial tool 106.

Figure 7A:
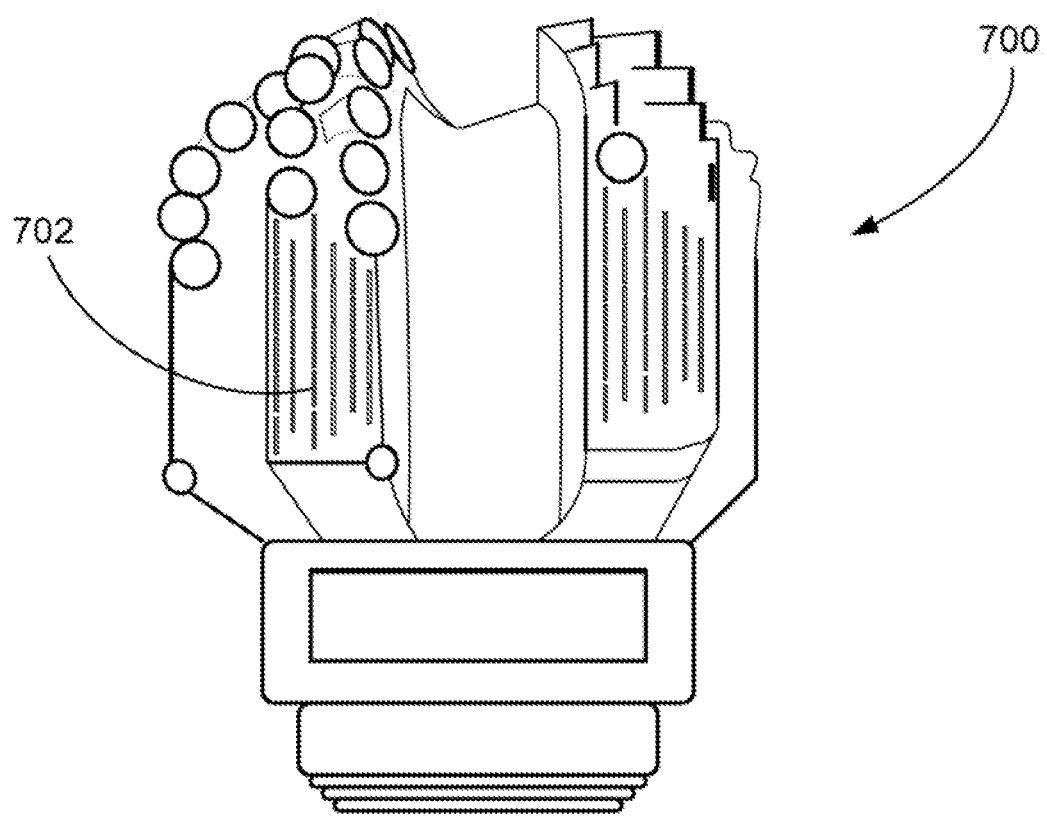
FIG. 7A is an example of an oil-well drilling bit.

The cameras 122, 124 and light sources 126 may provide an optimized imaging environment allowing an industrial tool 106 to be imaged with enough to detail to detect surface or below-surface changes of interest of an industrial tool over time, which may be caused by failure of the industrial tool 106 or general wearing from use. In one example, the ITI system 100 (and other ITI system examples) may be used to image a drill bit such as that used for drilling wellbores in and through the earth. FIG. 7A is an example of a drill bit 700 used to drill wellbores. As shown, the drill bit 700 as a whole has a working surface 702 with a complex and undulating shape, made up of subcomponents that collectively have both planar and non-planar surfaces of widely varying shape. These subcomponents include cutters that grind, cut, and scrape through geologic layers of earth as drilling is performed, such as in offshore oil-well drilling, gas exploration, geothermal applications, etc. The drill bit 700 also includes internal ports and nozzles used for clearing debris from the working surface during operation. Over time, the working surface 702 experiences general wearing, and possibly unexpected wearing, that can significantly alter both the surfaces and sub-surfaces of the bit and exert forces on the subcomponents, which can ultimately lead to failure of the drill bit 700 and its subcomponents.

Given the complex and ever-changing shape of the working surface 702 and sub-surfaces of the drill bit 700 and the rugged natural environments in which drill bits tend to be used, capturing images of the drill bit 700 with sufficient illumination and image quality to clearly show the full working surface 702 (and some sub-surfaces) and its nuanced undulations (as is required for any meaningful and reliable attempt to apply computer-automated, image-recognition analytics for the inspection and diagnosis of bit wear) is a very difficult task. With prior systems, quality image capture is hindered by a variety of limitations, including the phenomena of shadowing or complete obscuring across various areas of the working surface 702 caused by both the shape of the drill bit 700 and limitations in the ability to expose the full surface to illumination and image-capture equipment. The ITI system 100 (and other ITI system examples examples) provides sufficient image-capture resolution and surface illumination through (a) careful selection and placement of the cameras 122, 124 and light sources 126 and interoperation of the cameras 122, 124 and (b) dynamic relative positioning between the cameras/lights (on the one hand) and the drill bit (on the other hand) to ensure a capture of substantially all of the working surface 702 and available sub-surfaces of the drill bit 700. The sub-surfaces may be imaged through any ports and nozzles along the working surface 702 allowing some internal imaging of the drill bit 700. In one example, capturing substantially all of the working surface 702 and sub-surfaces entails capturing a sufficient number of images of useful quality of the drill bit of the working surface 702 and any sub-surfaces that provide the ability to identify any regions and features (and their respective attributes) as defined by the International Association of Drilling Contractors drill bit topology. In other examples, capturing substantially all of the working surface 702 and any sub-surfaces may be defined by other standards of image quality and number and in the industry.

The cameras 122, 124, through their selected position and image-quality specifications, may capture images along the working surface 702 that provide different views and perspectives at high resolution, allowing the various shapes of the working surface 702 and sub-surfaces to be specifically identified and analyzed in the images. The light sources 126, through their positioning and operational timing, may generate directed light in order to reduce shadows and otherwise provide proper lighting allowing an image of all or substantially all of the working surface 702 to be captured through the collection 2D images of portions of the working surface 702. The capture of high-resolution 2D images of all or substantially all of the working surface 702 allows a sufficient amount of detail necessary to make assessments regarding condition of the working surface 702 based on the 2D images. The high-resolution 2D images also allow creation of a 3D representation of all or substantially all of the working surface 702, which provides another tool in assessing the condition of the drill bit 700.

Use of different light spectra from the light sources 126 allows other aspects of the working surface 702 and sub-surfaces to be identified from the captured images. The images are not limited to working surface features and sub-surface aspects may also be revealed by the acquisition of various light spectra that is reflected, refracted or otherwise transmitted to the sensor from the industrial tool or any matter that has been applied to, joined with, infused within, or is otherwise attached on or in the industrial tool 106. For example, organic material that is forced within the matrix of a drill bits body or cutters during the drilling process. It may also be liquids that are imbibed in the industrial tool 106 during work.

While the examples described here are directed to drill bits used to drill wellbores, the ITI system 100 and other examples may be applied to various industrial tools. The positioning of the cameras 122, 124 and light sources 126 may be done to accommodate various industrial tool surfaces allowing optimal imaging with respect to the dimensions and shape of the industrial tool 106. Any suitable drive system, such as those shown in the various ITI system examples, may also be operated in conjunction with the cameras 122, 124 and light sources 126 to capture images of the industrial tool 106 at the specific perspectives and angles desired. In one example, capturing substantially all of external and/or internal portions of interest of an industrial tool, may be defined by the captured images being sufficient for forensic purposes as defined by an engineering specification or standard.

Figure 7B:
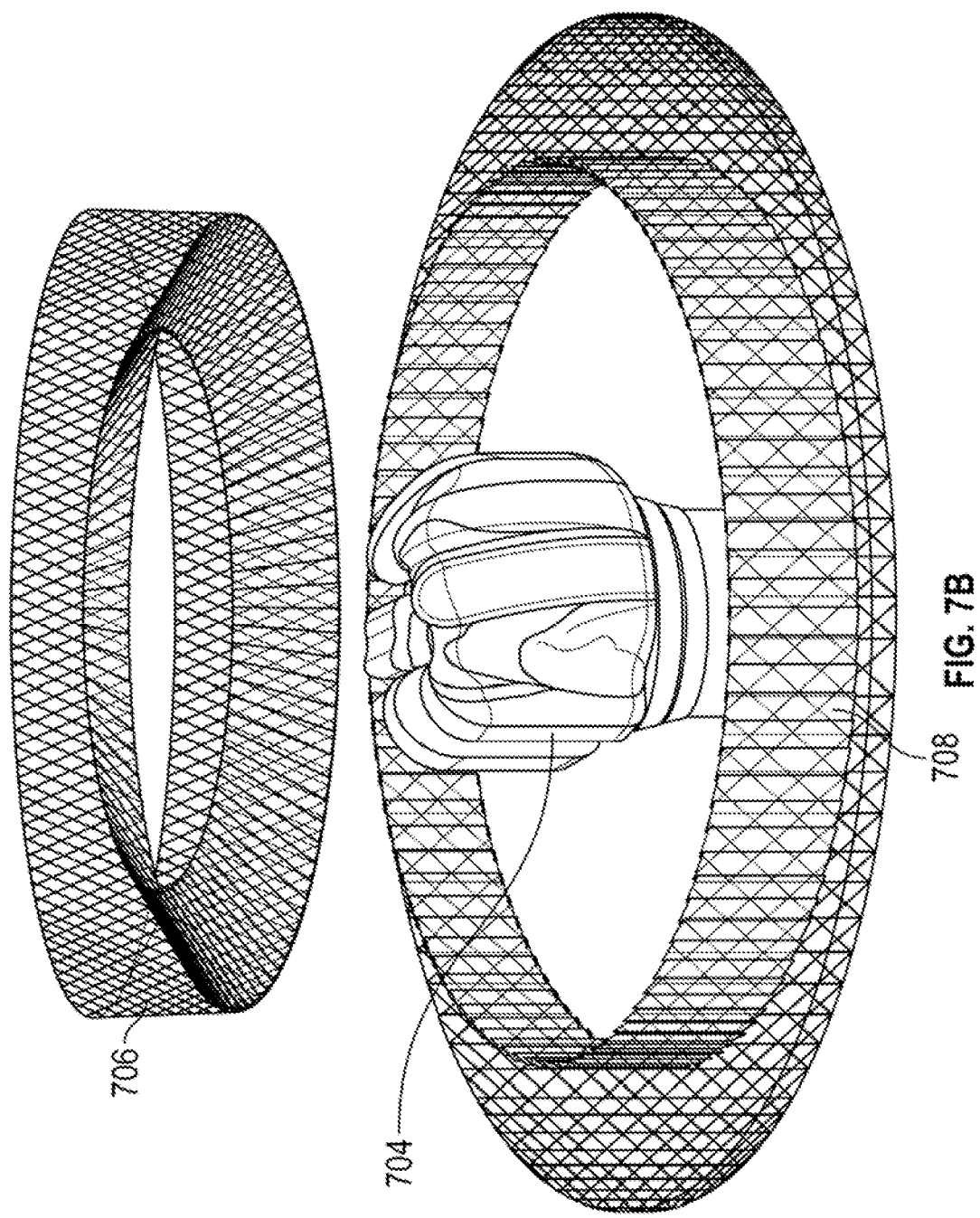
FIG. 7I is an example of a three-dimensional rendering of the oil-well drilling bit of FIG. 7A.

FIG. 7B is an example of a 3D rendering generated by an ITI system. In one example, the high resolution 2D images taken by the cameras 122, 126 from a full rotation around the drill bit 700 are processed by the processing unit 128 to generate a 3D image 704. The upper ring 706 indicates image perspectives and angles taken from one of the cameras 122, 124, with the lower ring indicating images from the other one of cameras 122, 124. These images may all be stitched together via the processing unit 128 to generate the 3D image 704. Based on the positioning of the cameras 122, 124 and light sources 126, the 3D image 704 may be rendered showing the necessary details of the working surface to allow proper analysis.

FIG. 8 is a block diagram of the ITI system 100 and a device 800. In one example, the processing unit 128 may communicate with a device 800. The device 800 may be any device, mobile or otherwise, such as cell phones, tablet computer, laptop computer, and desktop computer, for example, capable of communicating with the processing unit 128 over any suitable communication protocol such as Bluetooth, or Wi-Fi, for example, which is represented by network 801. The network 801 may be wired, wireless, or some combination thereof. The network 801 may be a virtual private network, web-based, directly-connected, or some other suitable network configuration. The device 800 may transmit commands 802 to the processing unit 128, which may be used to control the ITI system 100.

In one example, during operation, the processing unit 128 may receive 2D images captured from the cameras 122, 124. The processing unit 128 may execute software rendering the 2D images into a 3D image 802 of the industrial tool 106. In one example, the 3D images may be created using software capable of modeling and rendering images, such as RealityCapture, for example. The 3D image(s)(and 2D images in some examples) 804 may be transmitted to the device 800. In one example, the device 800 may further transmit the 3D (and 2D) images to one or more other devices or servers to perform any subsequent analyses 806 and/or persistent storage 808. The images 804 may be transmitted via the network 801 or may be transmitted in a different manner or through a different network. The additional analyses 804 may be used to diagnose any issues with the industrial tool 106. In some examples, the 3D images may be rendered by other systems besides the processing unit 128 separate from the ITI systems.

FIG. 9 is an operational flow diagram of the ITI system 100. An industrial tool 106 may be secured to a mounting plate 102 (900). The industrial tool 106 may be enclosed within the housing 200 through the lid 202 being placed on the housing 200 (902). The processing unit 128 of the ITI system 100 may be initialized (903). In one example, this may include powering on the processing unit 128 and inputting the particular industrial tool 106 being analyzed, such as via device 800.

Once the processing unit 128 has been initialized, the light sources 126 may be activated through the processing unit 128 (904). This may include activating only some of the light sources 126, for example, if different light spectra are available across the light sources 126 or depending on the camera 122, 124 taking the image at the specific time. The light sources 126 may adhere to a specified activation profile of the particular industrial tool 106 allowing optimal lighting to be provided based on a shape of the industrial tool 106 recognized by the processing unit 128. In other examples, a lighting profile may be created or changed from a stored lighting profile at the time the industrial tool 106 is being imaged.

The processing unit 128 may operate the cameras 122, 124 to capture a two-dimensional (2D) image of the industrial tool 106 at an initial position (906), which may be a predetermined position or any position in which the industrial tool 106 is initially placed in the housing 202. Once the initial images are captured via the cameras 122, 124, the processing unit 128 may operate the motor 110 to rotate the industrial tool 106 through rotation of the mounting plate 102 (908). The processing unit 128 may determine when the next position for image capturing is reached (910). Once reached, the processing unit 128 may operate the cameras 122, 124 to capture 2D images of the industrial tool 106 at the current position (912). The processing unit 128 may determine if the image capture is complete (914). If not complete, such as through a completion of a 360-degree rotation, the industrial tool 106 may continue rotation with the processing unit 128 determining when the next position for image capturing is reached (910). At each position, the processing unit 128 may capture images by operating each camera 122, 124 one-by-one and operating different subsets of light sources 126 for each camera, e.g., to eliminate shadows from other light sources 126.

The processing unit 128 may continue operating the cameras 122, 124 to capture 2D images of the industrial tool 106 at the preselected positions (912). Once complete, the processing unit 128 may cease rotation of the industrial tool 106 (916). The processing unit 128, or additionally-implemented system/tool, may render a 3D image of the industrial tool 106 (918). The processing unit 128, or other additionally-implemented system, may transmit the 3D image for additional analyses 806 (920). The 2D images may also be transmitted in some examples.

Figure 10:
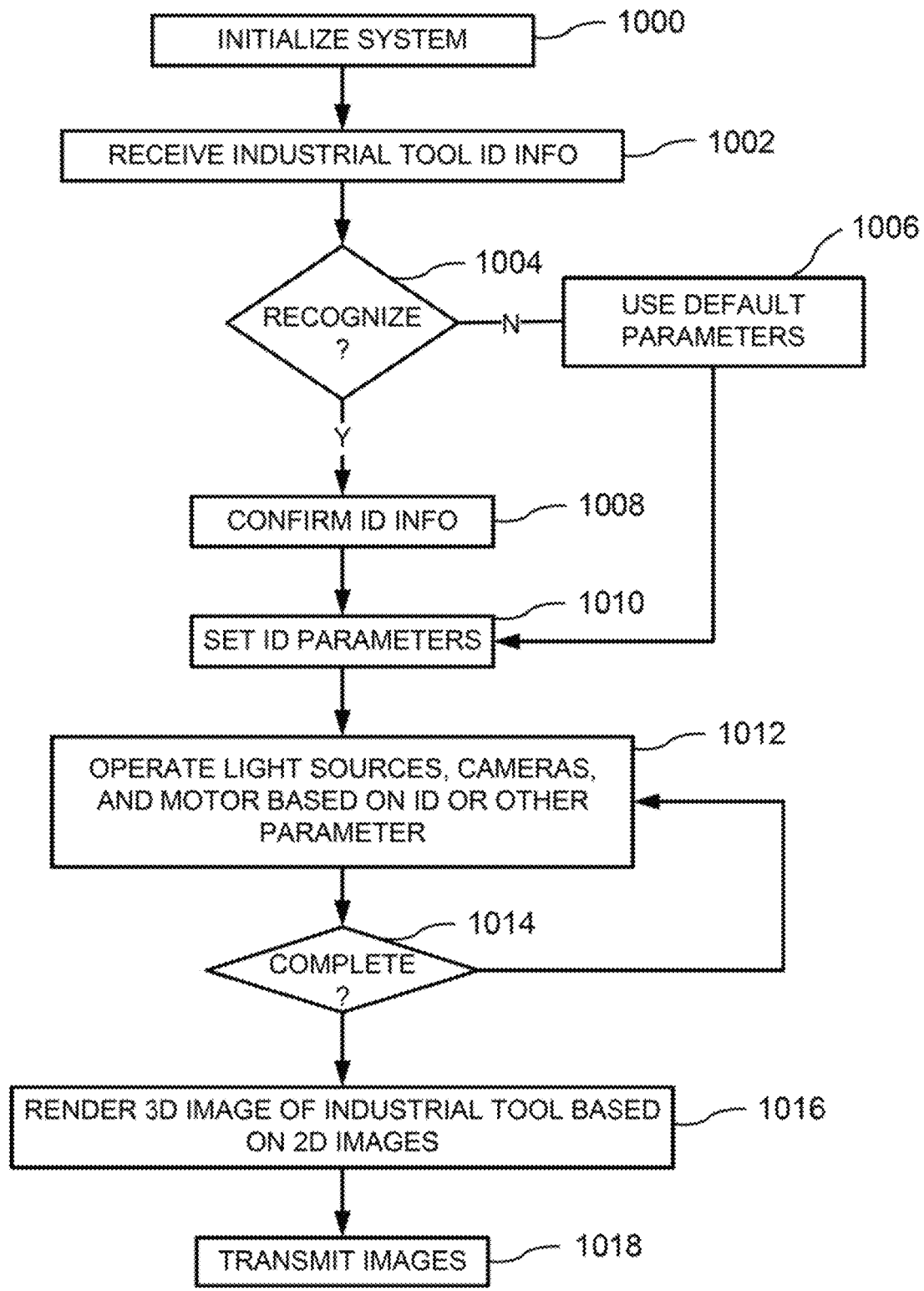
FIG. 10 is an operational flow diagram of example operation of a processing unit of an industrial tool imaging system.

FIG. 10 is an operational flow diagram of example operation of the processing unit 128 in an ITI system, such as the ITI system 100. The processing unit 128 may conduct a self-initialization (1000). In one example, this may initiate upon powering on of the processing unit 128. Once initialized, the processing unit 128 may receive identifying information regarding the industrial tool 106 (1002). In one example, this information may be provided to the processing tool 108 via an identifier input into the processing unit, such as through device 600 or through an interface included in the ITI system 100. In other examples, the processing unit 128 may maintain a library of industrial tool characteristics such that the processing unit 128 may retrieve specific characteristics based upon identifying information provided to the processing unit. In yet other examples, an industrial tool 106 may have a "QR-code"-style identifier allowing a device, such as the device 600, to scan the identifier, which may be relayed to the processing unit 128.

If the processing unit 128 does not recognize the industrial tool 106 (1004), the processing unit 128 may use a default setting for the industrial tool 106 (1006). The default setting may include a specific light source 126 and radian distance between images captured by the cameras 122, 144, if not using video. If the processing unit 128 recognizes the industrial tool 106 (604), the processing unit 128 may confirm the identifying information (1008), such as through a stored library, and set the industrial tool parameters accordingly (1010).

Once the parameters are set, the processing unit 128 may operate the light sources 126, cameras 122, 124, and motor 110 in order to capture images of the industrial tool 106 based on the industrial tool parameters (1012), which may include type of light spectra and number of radians of rotation between captured 2D images. Once the imaging is complete (1014), the processing unit 128 may render a 3D image based on the 2D images captured with the cameras 122, 124 (1016), which may be transmitted by the processing unit 128 for further analysis or storage (1018).

Figure 11:
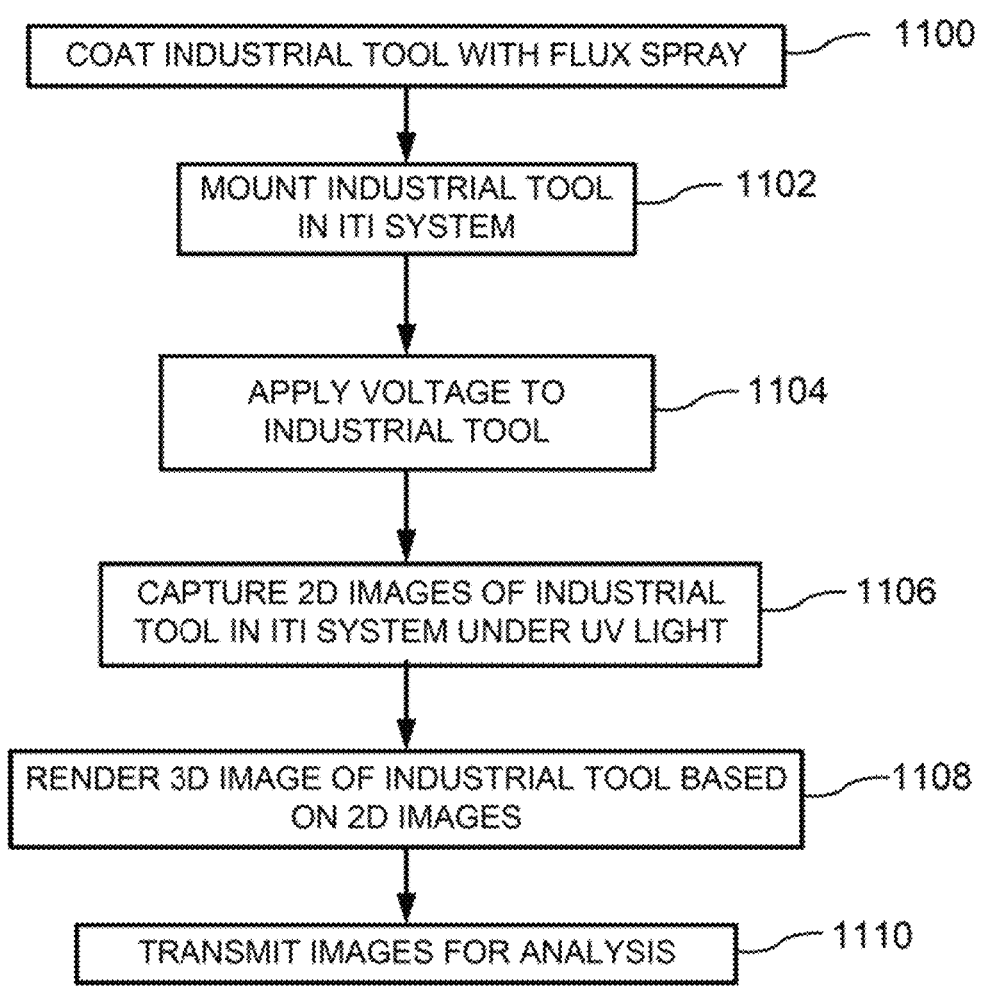
FIG. 11 is an operational flow diagram of imaging an industrial tool using magnetic flux.

FIG. 11 is an operational flow diagram of imaging an industrial tool using magnetic flux. In one example, an industrial tool, such as the industrial tool 106, may be sprayed with a magnetic flux spray (1100), such as Magnaglo® for example. The industrial tool 106 may be mounted in an ITI system (1102), such as the ITI system 100. An AC voltage may be applied to the industrial tool 106 (1104) directly or in close enough proximity to induce currents in the magnetic flux spray. In one example, the voltage may be supplied from the power supply 130 or additional power sources may be implemented. The ITI system 100 may capture 2D images of the industrial tool 106 with ultra-violet light being emitted from one or more of the light sources 126 (1106). A 3D image of the industrial tool 106 may be rendered by the processing unit 128 (1108) and the images 804 may be transmitted from subsequent analysis (1110). In one example, use of the flux spray in conjunction of the UV light may allow cracks in an industrial tool to be detected since magnetic flux would be created in the cracks and become detectable under the UV light. In some cases, application of magnetic flux or use of infra-red light will reveal sub-surface attributes. Additionally, if there are ports, nozzles, orifices or other openings to the inside of the industrial tool, we will gather information, via these images, that may be able to reveal forensic information about the industrial tool Additional analyses 806 may be used to identify such cracks in the industrial tool 106. In some cases, application of magnetic flux spray or use of infra-red light will reveal sub-surface attributes of an industrial tool. Additionally, if there are ports, nozzles, orifices or other openings to the inside of the industrial tool 106, images of these features may be able to reveal forensic information about the industrial tool 106.

Figure 12:
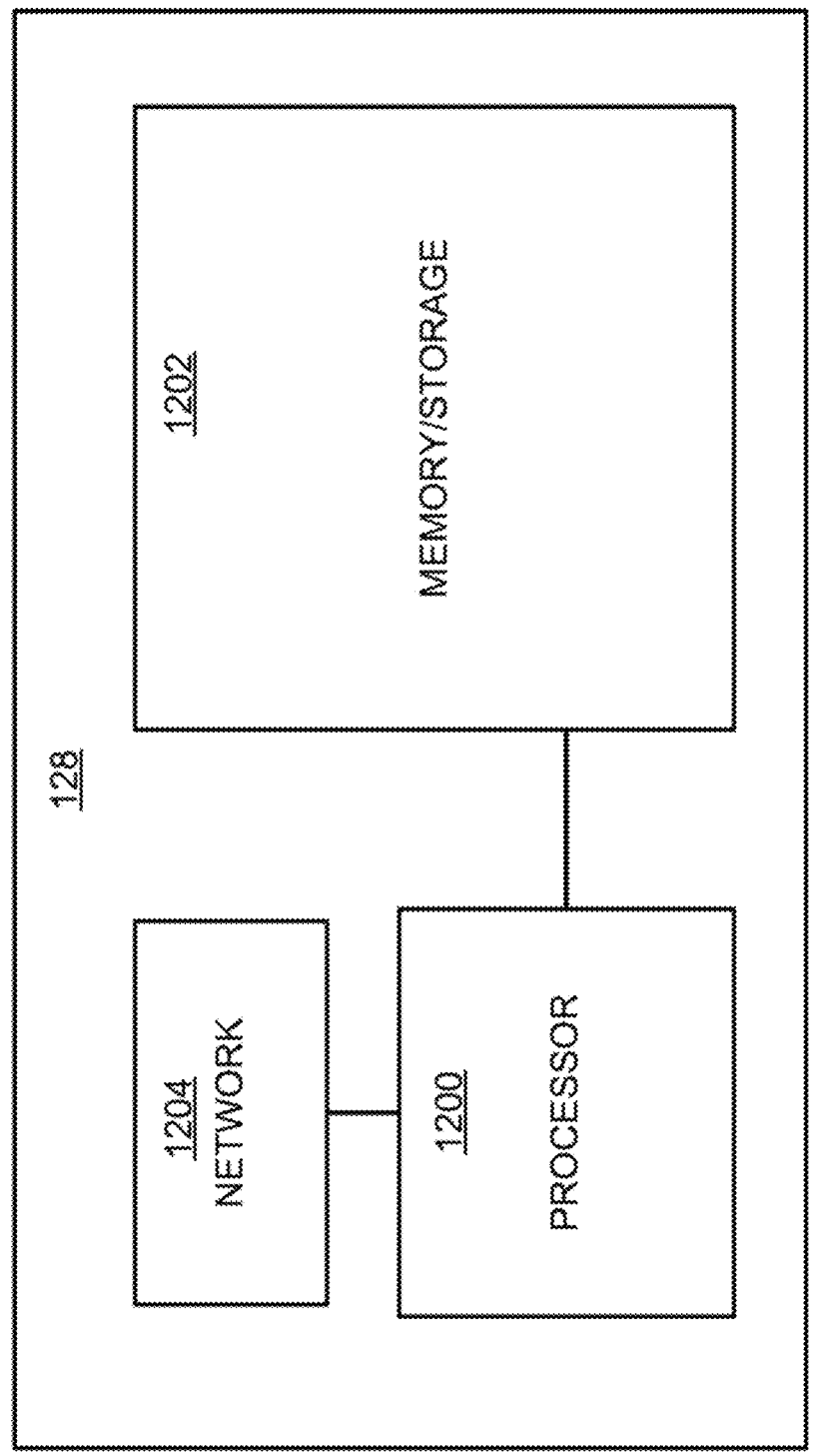
FIG. 12 is a block diagram of an example processing unit of an industrial tool imaging system.

FIG. 12 is a block diagram of the processing unit 128. In one example, the processing unit 128 may include on or more processors 1200. In one example, the processor 1200 may represent one or more physical processors and/or virtual processors. Various processing techniques may be implemented by the processors 105 such as multiprocessing, multitasking, parallel processing and the like, for example. In one example, the processor 1200 may be a central processing unit, graphics processing unit, tensor processing unit or some combination thereof. These processors may communicate or execute a database analytic platform such as those offered by Teradata®.

The memory/storage 1202 may include persistent and/or non-persistent storage. Any memory may include one or more memories and may be computer-readable storage media or memories, such as a cache, buffer, RAM, removable media, hard drive, flash drive or other computer-readable storage media. Computer-readable storage media may include various types of volatile and nonvolatile storage media. Any persistent storage may include hard disk drives, flash drives, or some combination thereof.

A network card 1204 may allow the processing unit to communicate via a network such as the network 701. The network card 1204 may operate as hardware or a combination of software and hardware or may be software executed with the processor 1200

While various examples of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An imaging system comprising:
    a housing having shape and size sufficient to receive an industrial tool inserted into the housing, wherein the housing is configured to enclose the industrial tool;
    a plurality of cameras and a plurality of light sources positioned within the housing in a manner to surround the industrial tool upon insertion of the industrial tool into the housing; and
    a processing unit configured to:
    control operation of the cameras and light sources and adjust relative positions of the cameras and light sources in relation to the industrial tool to capture a plurality of images of relevant portions of the industrial tool, wherein the plurality of images collectively reveal relevant portions of the industrial tool.

2. The imaging system of claim 1, further comprising a drive system, wherein the processing unit is further configured to control the drive system to adjust relative positions of the cameras and light sources in relation to the industrial tool.

3. The imaging system of claim 2, wherein the industrial tool is coupled to the drive system, and wherein the processing unit is further configured to control operation of the cameras and light sources and adjust relative positions of the cameras and light sources in relation to the industrial tool to capture a plurality of images of relevant surface portions of the industrial tool, wherein the plurality of images collectively reveal the relevant surface portions of the industrial tool.

4. The imaging system of claim 2, wherein the cameras and light sources are coupled to the drive system, and wherein the processing unit is further configured to control operation of the cameras and light sources and adjust relative positions of the cameras and light sources in relation to the industrial tool to capture a plurality of images of relevant sub-surface portions of the industrial tool, wherein the plurality of images collectively reveal the relevant sub-surface portions of the industrial tool.

5. The imaging system of claim 1, wherein the processing unit is further configured to:
    control the cameras to capture a plurality of two-dimensional images of the industrial tool; and
    render a three-dimensional overall image of the relevant surface portions of the industrial tool from the plurality of two-dimensional images.

6. The imaging system of claim 1, wherein the industrial tool is covered in magnetic flux spray, and wherein at least one of the light sources emits ultraviolet light.

7. The imaging system of claim 1, wherein the light sources are configured to emit at least one of visible light, infrared light, and ultraviolet light.

8. A method comprising:
    controlling, with a processing unit, operation of a plurality of cameras and a plurality of light sources positioned in a housing in a manner to surround an industrial tool, wherein the housing is of a shape and size sufficient to receive the industrial tool and enclose the industrial tool; and
    adjusting, with the processing unit, relative positions of the cameras and light sources in relation to the industrial tool to capture a plurality of images of relevant portions of the industrial tool, wherein the plurality of images collectively reveal relevant portions of the industrial tool.

9. The method of claim 8 further comprising controlling, with the processing unit, a drive system to adjust relative positions of the cameras and light sources in relation to the industrial tool.

10. The method of claim 9 further comprising controlling, with the processing unit, operation of the cameras and light sources and adjust relative positions of the cameras and light sources in relation to the industrial tool to capture a plurality of images of relevant surface portions of the industrial tool, wherein the plurality of images collectively reveal the relevant surface portions of the industrial tool.

11. The method of claim 9 further comprising controlling, with the processing unit, operation of the cameras and light sources and adjust relative positions of the cameras and light sources in relation to the industrial tool to capture a plurality of images of relevant sub-surface portions of the industrial tool, wherein the plurality of images collectively reveals the relevant sub-surface portions of the industrial tool.

12. The method of claim 8, further comprising:
controlling, with the processing unit, the plurality of cameras to capture a plurality of two-dimensional images of the industrial tool, and
rendering, with the processing unit, a three-dimensional overall image of the relevant surface portions of the industrial tool from the plurality of two-dimensional images.

13. The method of claim 8, wherein the industrial tool is covered in flux spray, wherein the method further comprises emitting at least one of the light sources emits ultraviolet light.

14. The method of claim 8, further comprising emitting, with at least one of the light sources, at least one of visible light, infrared light, and ultraviolet light.

15. A non-transitory computer-readable medium encoded with a plurality of instructions executable by a processor, wherein the plurality of instructions comprises instructions to:
instructions to control operation of a plurality of cameras and a plurality of light sources positioned in a housing in a manner to surround an industrial tool, wherein the housing is of a shape and size sufficient to receive the industrial tool and enclose the industrial tool; and
instructions to adjust relative positions of the cameras and light sources in relation to the industrial tool to capture a plurality of images of relevant portions of the industrial tool, wherein the plurality of images collectively reveals relevant surface portions of the industrial tool.

16. The non-transitory computer-readable medium of claim 15, wherein the plurality of instructions further comprises instructions to control a drive system to adjust relative positions of the cameras and light sources in relation to the industrial tool.

17. The non-transitory computer-readable medium of claim 16, wherein the industrial tool is coupled to the drive system, and wherein the plurality of instructions further comprises:
instructions to control operation of the cameras and light sources and adjust relative positions of the cameras and light sources in relation to the industrial tool to capture a plurality of images of relevant surface portions of the industrial tool, wherein the plurality of images collectively reveals the relevant surface portions of the industrial tool.

18. The non-transitory computer-readable medium of claim 16, wherein the cameras and lights are coupled to the drive system, and wherein the plurality of instructions further comprises:
instructions to control operation of the cameras and light sources and adjust relative positions of the cameras and light sources in relation to the industrial tool to capture a plurality of images of relevant sub-surface portions of the industrial tool, wherein the plurality of images collectively reveals the relevant sub-surface portions of the industrial tool.

19. The non-transitory computer-readable medium of claim 15, further comprising:
instructions to control the plurality of cameras to capture a plurality of two-dimensional images of the industrial tool, and
instructions to render a three-dimensional overall image of the relevant surface portions of the industrial tool from the plurality of two-dimensional images.

20. The non-transitory computer-readable medium of claim 15, further comprising instructions to emit, with at least one of the light sources, at least one of visible light, infrared light, and ultraviolet light.

* * * * *